(12) United States Patent
Gotou (10) Patent No.: US 10,320,661 B2
(45) Date of Patent: Jun. 11, 2019

(54) COMMUNICATION DEVICE AND COMMUNICATION METHOD

(71) Applicant: NEC Corporation, Tokyo (JP)

(72) Inventor: Kouhei Gotou, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/559,853

(22) PCT Filed: Mar. 14, 2016

(86) PCT No.: PCT/JP2016/001434
§ 371 (c)(1),
(2) Date: Sep. 20, 2017

(87) PCT Pub. No.: WO2016/152082
PCT Pub. Date: Sep. 29, 2016

(65) Prior Publication Data
US 2018/0083867 A1  Mar. 22, 2018

(30) Foreign Application Priority Data

Mar. 23, 2015 (JP) ................................. 2015-059393

(51) Int. Cl.
*H04L 12/721* (2013.01)
*H04L 12/715* (2013.01)
(Continued)

(52) U.S. Cl.
CPC .............. *H04L 45/38* (2013.01); *H04L 12/66* (2013.01); *H04L 45/64* (2013.01); *H04L 45/66* (2013.01);
(Continued)

(58) Field of Classification Search
CPC ..... H04L 45/38; H04L 61/103; H04L 45/741; H04L 45/66; H04L 12/66
See application file for complete search history.

(56) References Cited

U.S. PATENT DOCUMENTS

2003/0081614 A1* 5/2003 Sukegawa ........... H04L 12/2801
370/395.42
2004/0034800 A1 2/2004 Singhal et al.
(Continued)

FOREIGN PATENT DOCUMENTS

JP 2002-064587 A 2/2002
JP 2002-247098 A 8/2002
(Continued)

OTHER PUBLICATIONS

International Search Report of PCT/JP2016/001434 dated Apr. 26, 2016.
(Continued)

*Primary Examiner* — Mohammad S Anwar
(74) *Attorney, Agent, or Firm* — Sughrue Mion, PLLC (57) ABSTRACT

A communication device (10) includes a communication IF (11) transmits and receives, in a layer 2, a packet having a structure that does not include a MAC address; a TCP/IP processing unit (12) transmits and receives a packet in a TCP/IP layer; and a switch (13) performs processing on the packet received by the communication IF (11) and the TCP/IP processing unit (12). When the switch (13) performs processing for transmitting, from the TCP/IP processing unit (12), the packet received by the communication IF (11), a pseudo MAC header is added to the packet and the packet is output to the TCP/IP processing unit (12). When the switch (13) performs processing for transmitting, from the communication IF (11), the packet received by the TCP/IP processing unit (12), the pseudo MAC header is deleted
(Continued)

from the packet and the packet is output to the communication IF (11).

6 Claims, 5 Drawing Sheets

(51) Int. Cl.
*H04L 12/749* (2013.01)
*H04L 29/12* (2006.01)
*H04L 12/66* (2006.01)
*H04W 80/02* (2009.01)
*H04W 80/06* (2009.01)

(52) U.S. Cl.
CPC .......... *H04L 45/741* (2013.01); *H04L 61/103* (2013.01); *H04L 61/6022* (2013.01); *H04W 80/02* (2013.01); *H04W 80/06* (2013.01)

(56) References Cited

U.S. PATENT DOCUMENTS

| | | | |
|---|---|---|---|
| 2009/0037587 A1* | 2/2009 | Yoshimi | H04L 63/045 709/227 |
| 2012/0177044 A1* | 7/2012 | Berman | H04L 12/4625 370/392 |
| 2013/0170493 A1 | 7/2013 | Mattson | |

FOREIGN PATENT DOCUMENTS

| | | |
|---|---|---|
| JP | 2003-333064 A | 11/2003 |
| JP | 2007-318640 A | 12/2007 |

OTHER PUBLICATIONS

Communication dated Aug. 28, 2018 from the Japanese Office Action in counterpart application No. 2015-059393.

* cited by examiner

STRUCTURE OF ETHERNET PACKET

STRUCTURE OF PPP PACKET

COMMUNICATION DEVICE AND COMMUNICATION METHOD

CROSS REFERENCE TO RELATED APPLICATIONS

This application is a National Stage of International Application No. PCT/JP2016/001434 filed Mar. 14, 2016, claiming priority based on Japanese Patent Application No. 2015-059393 filed Mar. 23, 2015, the contents of all of which are incorporated herein by reference in their entirety.

TECHNICAL FIELD

The present invention relates to a communication device and a communication method.

BACKGROUND ART

In recent years, a centralized control network architecture has been proposed. As an example of the centralized control network architecture, a technique called an open flow (OpenFlow) is known. The open flow is implemented by an open flow controller (OpenFlow Controller) and an open flow switch (OpenFlow Switch).

The open flow controller sets a flow table for the open flow switch. The flow table is composed of a flow entry in which a processing rule for a packet belonging to a flow is described. Upon receiving a packet, the open flow switch searches the corresponding flow entry from the flow table, and processes the packet in accordance with the processing rule described in the searched flow entry. Note that when the flow entry is not searched, the open flow controller creates a new flow entry and adds the created flow entry to the flow table.

CITATION LIST

Patent Literature

[PTL 1] Japanese Unexamined Patent Application Publication No. 2002-064587
[PTL 2] Japanese Unexamined Patent Application Publication No. 2002-247098
[PTL 3] Japanese Unexamined Patent Application Publication No. 2003-333064

SUMMARY OF INVENTION

Technical Problem

Some of the recent communication devices provided with an open flow switch include a TCP/IP processing unit that transmits packets to a communication application and receives packets therefrom in a TCP/IP (Transmission Control Protocol/Internet Protocol) layer so that an open flow is applied to a flow generated in the communication application within the same communication device. Accordingly, the open flow switch may transfer packets between a communication interface in a layer 2 and a TCP/IP processing unit, which is in a layer above the layer 2, in accordance with the flow table.

However, in technical standards for the open flow, only communication interfaces of a wired LAN (Local Area Network) system and a wireless LAN system are dealt with as the communication interface for the layer 2 in the open flow switch. Accordingly, the packets used for communication in the open flow switch are limited to packets having a structure including a MAC (Media Access Control) address. In other words, packets having a structure that does not include a MAC address, such as a PPP (Point to Point Protocol) packet (PTL 1 to 3) which is used for cellular communication systems, such as 3G (Generation) and LTE (Long Term Evolution), are not used for communication in the open flow switch. Therefore, the open flow cannot be applied to devices that perform wireless communication of a cellular communication system using a PPP packet.

Accordingly, an object of the present invention is to solve the above-mentioned problem and provide a communication device and a communication method by which packets having a structure that does not include a MAC address can be used for communication.

Solution to Problem

In one aspect, a communication device includes: a first communication interface configured to transmit and receive, in a layer 2, a packet having a structure that does not include a MAC (Media Access Control) address; a TCP/IP (Transmission Control Protocol/Internet Protocol) processing unit configured to transmit and receive a packet in a TCP/IP layer; a switch unit configured to perform processing on the packet received by the first communication interface and the packet received by the TCP/IP processing unit; and a MAC header processing unit configured to add a pseudo MAC header including a pseudo MAC address to a packet, and delete the pseudo MAC header from the packet. When processing for transmitting, from the TCP/IP processing unit, the packet received by the first communication interface is performed, the MAC header processing unit adds the pseudo MAC header to the packet received by the first communication interface, and the switch unit outputs, to the TCP/IP processing unit, the packet to which the pseudo MAC header is added. When processing for transmitting, from the first communication interface, the packet received by the TCP/IP processing unit is performed, the MAC header processing unit deletes the pseudo MAC header from the packet received by the TCP/IP processing unit, and the switch unit outputs, to the first communication interface, the packet from which the pseudo MAC header is deleted In another aspect, a communication method is a communication method to be performed by a communication device. The communication device includes: a first communication interface configured to transmit and receive, in a layer 2, a packet having a structure that does not include a MAC address; a TCP/IP processing unit configured to transmit and receive a packet in a TCP/IP layer; and a switch configured to perform processing on the packet received by the first communication interface and the packet received by the TCP/IP processing unit. In the communication method, when processing for transmitting, from the TCP/IP processing unit, the packet received by the first communication interface is performed, the switch adds a pseudo MAC header including a pseudo MAC address to the packet received by the first communication interface, and outputs, to the TCP/IP processing unit, the packet to which the pseudo MAC header is added. Further, when processing for transmitting, from the first communication interface, the packet received by the TCP/IP processing unit is performed, the switch deletes the pseudo MAC header from the packet received by the TCP/IP processing unit and outputs, to the first communication interface, the packet from which the pseudo MAC header is deleted.

Advantageous Effects of Invention

According to the aspects described above, an advantageous effect that packets having a structure that does not include a MAC address can be used for communication is obtained.

DESCRIPTION OF EMBODIMENTS

Embodiments of the present invention will be described below with reference to the drawings.

(1) First Embodiment

Figure 1:
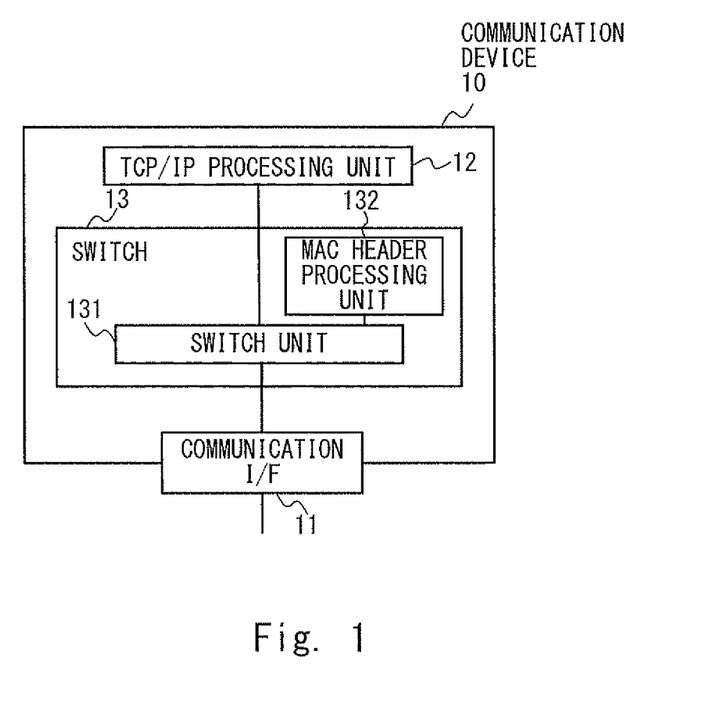
FIG. 1 is a block diagram showing a configuration example of a communication device according to a first embodiment.

FIG. 1 shows a configuration example of a communication device 10 according to this embodiment. The communication device 10 shown in FIG. 1 includes a communication interface (IF) 11, a TCP/IP processing unit 12, and a switch 13.

The communication interface 11 is a first communication interface that transmits and receives, in a layer 2, packets having a structure that does not include a MAC address.

The TCP/IP processing unit 12 is a unit that transmits and receives packets in a TCP/IP layer.

The switch 13 includes a switch unit 131 and an MAC header processing unit 132. When a packet is received by the communication interface 11 and the TCP/IP processing unit 12, the switch unit 131 processes the packet. The MAC header processing unit 132 adds a pseudo MAC header including a pseudo MAC address to a packet, and deletes the pseudo MAC header from the packet.

The switch unit 131 performs processing for transmitting, from the TCP/IP processing unit 12, the packet received by the communication interface 11. In this case, the packet received by the communication interface 11 does not include a MAC address, and thus the packet cannot be transmitted from the TCP/IP processing unit 12 without changing the structure of the packet. Accordingly, the switch unit 131 delivers the packet received by the communication interface 11 to the MAC header processing unit 132. The MAC header processing unit 132 adds a pseudo MAC header to the packet delivered from the switch unit 131, and then returns the packet to the switch unit 131. The switch unit 131 outputs the packet returned from the MAC header processing unit 132 to the TCP/IP processing unit 12. As a result, the packet received by the communication interface 11 includes the pseudo MAC address, which makes it possible to transmit the packet from the TCP/IP processing unit 12.

Further, the switch unit 131 performs processing for transmitting, from the communication interface 11, the packet received by the TCP/IP processing unit 12. In this case, the packet received by the TCP/IP processing unit 12 includes the pseudo MAC address. Accordingly, the switch unit 131 delivers the packet received by the TCP/IP processing unit 12 to the MAC header processing unit 132. The MAC header processing unit 132 deletes the pseudo MAC header from the packet delivered from the switch unit 131 and returns the packet to the switch unit 131. The switch unit 131 outputs the packet returned from the MAC header processing unit 132 to the communication interface 11. Thus, the packet from which the pseudo MAC address is deleted can be transmitted from the communication interface 11.

As described above, in this embodiment, when the packet received by the communication interface 11 is transmitted from the TCP/IP processing unit 12, the communication device 10 adds a pseudo MAC header to the packet. Further, when the packet received by the TCP/IP processing unit 12 is transmitted from the communication interface 11, the communication device 10 deletes the pseudo MAC header from the packet. Thus, in the communication device 10, packets having a structure that does not include a MAC address can also be used for communication.

(2) Second Embodiment

Figure 2:
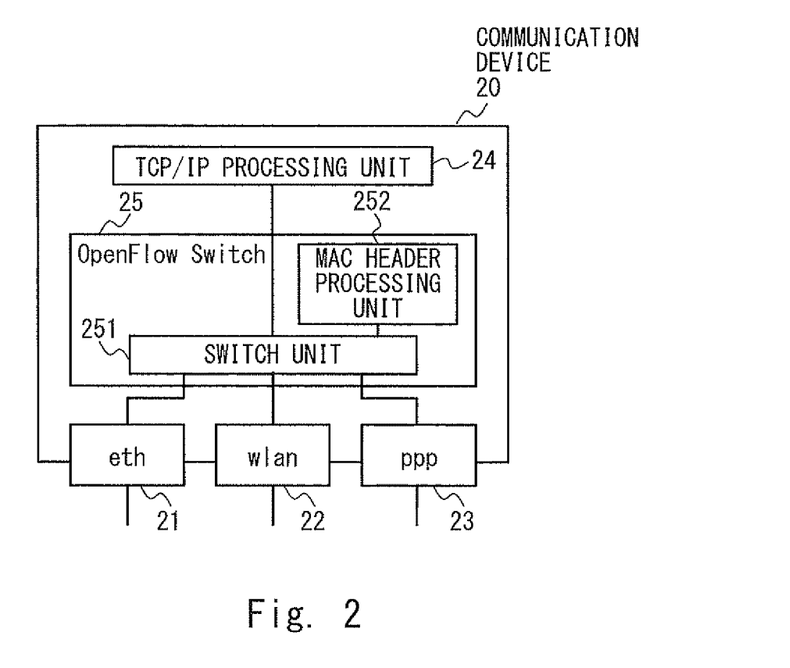
FIG. 2 is a block diagram showing a configuration example of a communication device according to a second embodiment.

This embodiment is a specific embodiment of the configuration and operation of the first embodiment. FIG. 2 shows a configuration example of a communication device 20 according to this embodiment. The communication device 20 shown in FIG. 2 includes an Ethernet® communication interface 21, a WLAN (Wireless LAN) communication interface 22, a PPP communication interface 23, a TCP/IP processing unit 24, and an open flow switch 25.

Figure 3:
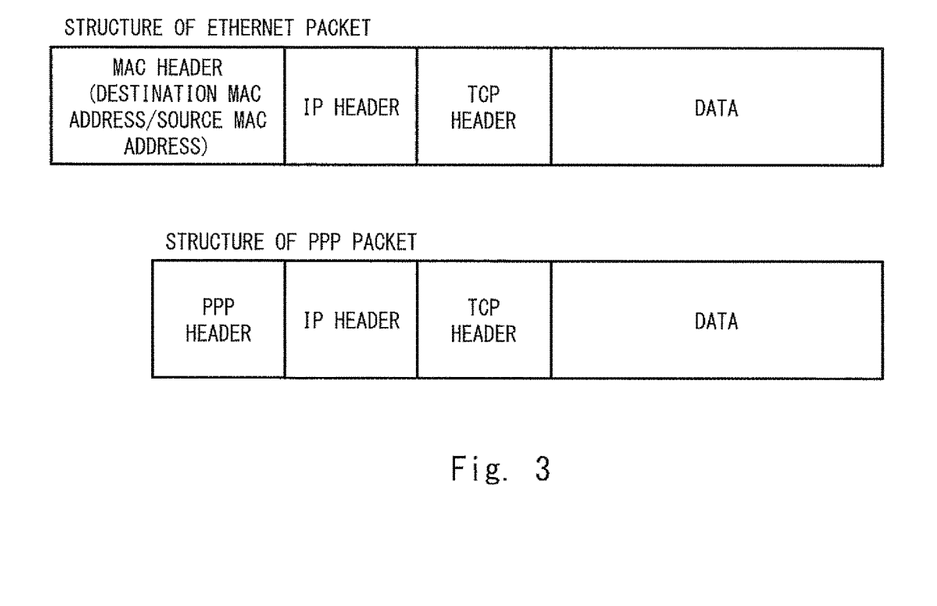
FIG. 3 is a diagram showing examples of structures of an Ethernet® packet and a PPP packet.

The Ethernet® communication interface 21 is a second communication interface that transmits and receives an Ethernet® packet in the layer 2. The WLAN (Wireless LAN) communication interface 22 is a second communication interface that transmits and receives a WLAN packet in the layer 2. The PPP communication interface 23 is a first communication interface that transmits and receives a PPP packet in the layer 2. Among these packets, the Ethernet® packet and the WLAN packet are packets having a structure including a MAC address. On the other hand, the PPP packet is a packet having a structure that does not include a MAC address. FIG. 3 shows examples of the structures of the Ethernet® packet and the PPP packet. A MAC header including a destination MAC address and a source MAC address is added to the Ethernet® packet. Instead of a MAC header, a PPP header is added to the PPP packet, and thus the PPP header does not include a MAC address.

The TCP/IP processing unit 24 is a unit that transmits and receives packets in the TCP/IP layer. For example, in the case of applying an open flow to a flow generated in a communication application, which is not shown, in the communication device 20, the TCP/IP processing unit 24 transmits packets to the communication application and receives packets therefrom in the TCP/IP layer. Alternatively, the TCP/IP processing unit 24 transmits packets to an external device of the communication device 20 and receives packets therefrom in the TCP/IP layer.

The open flow switch 25 includes a switch unit 251 and a MAC header processing unit 252. The switch unit 251 includes a flow table which is not shown. When the communication interfaces 21 to 23 and the TCP/IP processing unit 24 receive a packet, the switch unit 251 processes the packet in accordance with the flow table. The MAC header processing unit 252 adds a pseudo MAC header including a pseudo destination MAC address and a pseudo source MAC address to a packet, and deletes the pseudo MAC header from the packet.

The switch unit 251 performs processing for transmitting, from the TCP/IP processing unit 24, the packet (PPP packet) received by the PPP communication interface 23, in accordance with the flow table. In this case, the packet received by the PPP communication interface 23 does not include a MAC address, and thus the packet cannot be transmitted from the TCP/IP processing unit 24 without changing the structure of the packet. Accordingly, the switch unit 251 delivers the packet received by the PPP communication interface 23 to the MAC header processing unit 252. The MAC header processing unit 252 deletes the PPP header from the packet delivered from the switch unit 251, and adds a pseudo MAC header to the packet in place of the PPP header and returns the packet to the switch unit 251. The switch unit 251 outputs the packet returned from the MAC header processing unit 252 to the TCP/IP processing unit 24. As a result, the packet received by the PPP communication interface 23 includes the pseudo MAC address, which makes it possible to transmit the packet from the TCP/IP processing unit 24. Note that the pseudo destination MAC address and the pseudo source MAC address to be included in the pseudo MAC header added by the MAC header processing unit 252 are not particularly limited. This is because in the packets transmitted from the TCP/IP processing unit 24 in the TCP/IP layer, an IP address in an IP header is referred to later. However, in order to avoid duplication of the MAC address of the Ethernet® communication interface 21 and the MAC address of the WLAN communication interface 22, a pseudo destination MAC address and a pseudo source MAC address that are different from these MAC addresses are preferably included in the pseudo MAC header.

Note that the switch unit 251 performs processing for transmitting, from the TCP/IP processing unit 24, the packet received by the Ethernet® communication interface 21 or the WLAN communication interface 22, in accordance with the flow table. In this case, the switch unit 251 outputs the packet received by the Ethernet® communication interface 21 or the WLAN communication interface 22 to the TCP/IP processing unit 24 without delivering the packet to the MAC header processing unit 252.

Further, the switch unit 251 performs processing for transmitting, from the PPP communication interface 23, the packet (IP packet) received by the TCP/IP processing unit 24, in accordance with the flow table. In this case, the packet received by the TCP/IP processing unit 24 includes a pseudo MAC address. Accordingly, the switch unit 251 delivers the packet received by the TCP/IP processing unit 24 to the MAC header processing unit 252. The MAC header processing unit 252 deletes the pseudo MAC header from the packet delivered from the switch unit 251, and adds a PPP header to the packet in place of the pseudo MAC header and returns the packet to the switch unit 251. The switch unit 251 outputs the packet returned from the MAC header processing unit 252 to the PPP communication interface 23. Thus, the packet from which the pseudo MAC address is deleted can be transmitted from the PPP communication interface 23. Note that the MAC header processing unit 252 includes, in the PPP header to be added, the address of a device that performs PPP communication via the communication device 20 or with the communication device 20.

The switch unit 251 performs processing for transmitting, from the Ethernet® communication interface 21 or the WLAN communication interface 22, the packet received by the TCP/IP processing unit 24, in accordance with the flow table. In this case, the switch unit 251 outputs the packet received by the TCP/IP processing unit 24 to the Ethernet® communication interface 21 or the WLAN communication interface 22 without delivering the packet to the MAC header processing unit 252.

The operation of the communication device 20 according to this embodiment will be described below.

Figure 4:
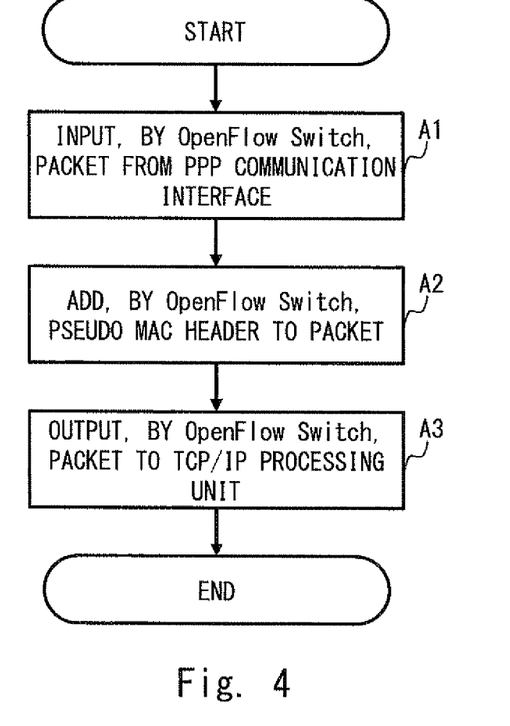
FIG. 4 is a flowchart showing an operation example when a packet received by a PPP communication interface in the communication device according to the second embodiment is transmitted from a TCP/IP processing unit.

First, an operation to be performed when the packet received by the PPP communication interface 23 is transmitted from the TCP/IP processing unit 24 will be described with reference to FIG. 4. When the PPP communication interface 23 receives a packet (PPP packet), the packet is input to the open flow switch 25 (step A1). Then, the switch unit 251 confirms the processing rule for the input packet in accordance with the flow table. Assume herein that processing for transmitting the packet from the TCP/IP processing unit 24 is performed. In this case, the switch unit 251 delivers the packet received by the PPP communication interface 23 to the MAC header processing unit 252. The MAC header processing unit 252 deletes the PPP header from the packet delivered from the switch unit 251, and adds a pseudo MAC header to the packet in place of the PPP header and returns the packet to the switch unit 251 (step A2). After that, the switch unit 251 outputs the packet returned from the MAC header processing unit 252 to the TCP/IP processing unit 24 (step A3).

Figure 5:
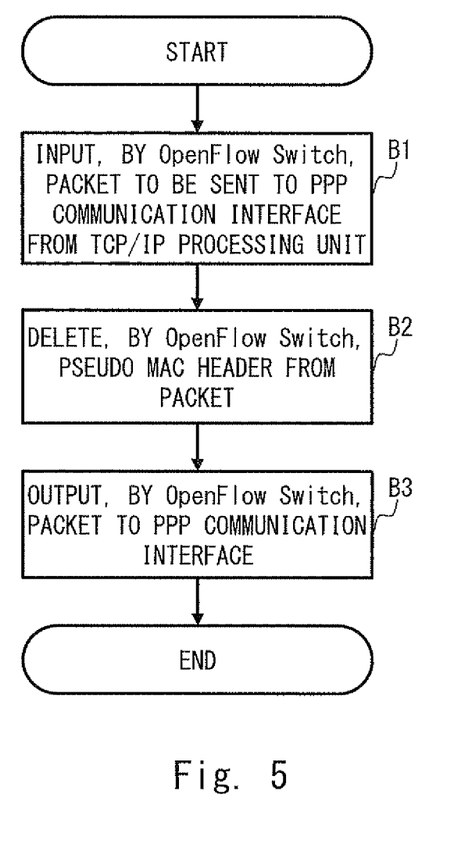
FIG. 5 is a flowchart showing an operation example when a packet received by the TCP/IP processing unit in the communication device according to the second embodiment is transmitted from the PPP communication interface.

Next, an operation to be performed when the packet received by the TCP/IP processing unit 24 is transmitted from the PPP communication interface 23 will be described with reference to FIG. 5. When the TCP/IP processing unit 24 receives a packet (IP packet), the packet is input to the open flow switch 25 (step B1). Then, the switch unit 251 confirms the processing rule for the input packet in accordance with the flow table. Assume herein that processing for transmitting the packet from the PPP communication interface 23 is performed. In this case, the switch unit 251 delivers the packet received by the TCP/IP processing unit 24 to the MAC header processing unit 252. The MAC header processing unit 252 deletes the pseudo MAC header from the packet delivered from the switch unit 251, and adds a PPP header to the packet in place of the pseudo MAC header and returns the packet to the switch unit 251 (step B2). After that, the switch unit 251 outputs the packet returned from the MAC header processing unit 252 to the PPP communication interface 23 (step B3).

As described above, in this embodiment, when the packet received by the PPP communication interface 23 is transmitted from the TCP/IP processing unit 24, the communication device 20 adds a pseudo MAC header to the packet. Further, when the packet received by the TCP/IP processing unit 24 is transmitted from the PPP communication interface 23, the communication device 20 deletes the pseudo MAC header from the packet. Accordingly, in the communication device 20, a packet (PPP packet) having a structure that does not include a MAC address can also be used for communication. Consequently, the open flow can also be applied to a device that performs wireless communication of a cellular communication system using a PPP packet.

While the present invention has been described above with reference to embodiments, the present invention is not limited to the above embodiments. The configuration and details of the present invention can be modified in various ways that can be understood by those skilled in the art within the scope of the invention.

For example, the second embodiment described above includes one first communication interface that transmits and receives a packet having a structure that does not include a MAC address, and two second communication interfaces that transmit and receive a packet having a structure including a MAC address. However, the number of first communication interfaces and the number of second communication interfaces are not limited to these numbers. In the present invention, at least one first communication interface may be provided.

In the first and second embodiments, an open flow controller is not illustrated. However, the communication device including the open flow switch may be provided with an open flow controller. Alternatively, an external device of the communication device including the open flow switch may be provided with an open flow controller.

In the embodiments described above, a PPP packet is illustrated as an example of a packet having a structure that does not include a MAC address. However, the present invention can also be applied to packets other than the PPP packet, as long as the packets have a structure that does not include a MAC address.

Further, the processing in the communication device may be implemented by causing a CPU (Central Processing Unit) to execute a computer program. The program can be stored and provided to a computer using various types of non-transitory computer readable media. The non-transitory computer readable media include various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Compact Disk-Read Only Memory), CD-R (CD-Recordable, CD-R/W (CD-ReWritable), and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computers through a wire communication path such as an electrical wire and an optical fiber, or a wireless communication path.

This application is based upon and claims the benefit of priority from Japanese patent application No. 2015-059393, filed on Mar. 23, 2015, the disclosure of which is incorporated herein in its entirety by reference.

REFERENCE SIGNS LIST

10 COMMUNICATION DEVICE
11 COMMUNICATION INTERFACE
12 TCP/IP PROCESSING UNIT
13 SWITCH
131 SWITCH UNIT
132 MAC HEADER PROCESSING UNIT
20 COMMUNICATION DEVICE
21 ETHERNET® COMMUNICATION INTERFACE
22 WLAN COMMUNICATION INTERFACE
23 PPP COMMUNICATION INTERFACE
24 TCP/IP PROCESSING UNIT
25 OPEN FLOW SWITCH
251 SWITCH UNIT
252 MAC HEADER PROCESSING UNIT

The invention claimed is:

1. A communication device comprising:
a first communication interface configured to transmit and receive, in a layer 2, a PPP (Point to Point Protocol) packet having a structure that does not include a MAC (Media Access Control) address;
a TCP/IP (Transmission Control Protocol/Internet Protocol) processing unit configured to transmit and receive a second packet in a TCP/IP layer;
a switch unit configured to perform processing on the PPP packet received by the first communication interface and the second packet received by the TCP/IP processing unit; and
a MAC header processing unit configured to add a pseudo MAC header including a pseudo MAC address to the PPP packet, and delete the pseudo MAC header from the second packet, wherein
when processing for transmitting, from the TCP/IP processing unit, the PPP packet received by the first communication interface is performed, the MAC header processing unit deletes a PPP header from the PPP packet received by the first communication interface and adds the pseudo MAC header to the PPP packet in place of the PPP header, and the switch unit outputs, to the TCP/IP processing unit, the packet from which the PPP header is deleted and to which the pseudo MAC header is added;
when processing for transmitting, from the first communication interface, the second packet received by the TCP/IP processing unit is performed, the MAC header processing unit deletes the pseudo MAC header from the second packet received by the TCP/IP processing unit and adds the PPP header to the second packet in place of the pseudo MAC header, and the switch unit outputs, to the first communication interface, the packet from which the pseudo MAC header is deleted and to which the PPP header is added.

2. The communication device according to claim 1, further comprising a second communication interface configured to transmit and receive, in the layer 2, a packet having a structure including a MAC address, wherein
when processing for transmitting, from the TCP/IP processing unit, the packet received by the second communication interface is performed, the switch unit outputs, to the TCP/IP processing unit, the packet received by the second communication interface, and
when processing for transmitting, from the second communication interface, the packet received by the TCP/IP processing unit is performed, the switch unit outputs the packet received by the TCP/IP processing unit to the second communication interface.

3. The communication device according to claim 2, wherein when the MAC header processing unit adds the pseudo MAC header to the PPP packet received by the first communication interface, the MAC header processing unit adds the pseudo MAC header including the pseudo MAC address different from the MAC address of the second communication interface.

4. A communication method to be performed by a communication device including: a first communication interface configured to transmit and receive, in a layer 2, a PPP (Point to Point Protocol) packet having a structure that does not include a MAC address; a TCP/IP processing unit configured to transmit and receive a second packet in a TCP/IP layer; and a switch configured to perform processing on the PPP packet received by the first communication interface and the second packet received by the TCP/IP processing unit, the communication method comprising:
  when processing for transmitting, from the TCP/IP processing unit, the PPP packet received by the first communication interface is performed, the switch deletes a PPP header from the packet received by the first communication interface and adds a pseudo MAC header to the PPP packet in place of the PPP header, and outputs, to the TCP/IP processing unit, the packet from which the PPP header is deleted and to which the pseudo MAC header is added;
  when processing for transmitting, from the first communication interface, the second packet received by the TCP/IP processing unit is performed, the switch deletes the pseudo MAC header from the second packet received by the TCP/IP processing unit and adds the PPP header to the second packet in place of the pseudo MAC header, and outputs, to the first communication interface, the packet from which the pseudo MAC header is deleted and to which the PPP header is added.

5. The communication method according to claim 4, wherein
  the communication device further includes a second communication interface configured to transmit and receive, in the layer 2, a packet having a structure including a MAC address,
  when processing for transmitting, from the TCP/IP processing unit, the packet received by the second communication interface is performed, the switch outputs, to the TCP/IP processing unit, the packet received by the second communication interface, and
  when processing for transmitting, from the second communication interface, the packet received by the TCP/IP processing unit is performed, the switch outputs the packet received by the TCP/IP processing unit to the second communication interface.

6. The communication method according to claim 5, wherein when the pseudo MAC header is added to the PPP packet received by the first communication interface, the switch adds the pseudo MAC header including the pseudo MAC address different from the MAC address of the second communication interface.

* * * * *